United States Patent
Chu

(10) Patent No.: US 6,637,288 B2
(45) Date of Patent: Oct. 28, 2003

(54) COMPACT FOLDING HANDLE BAR APPARATUS FOR BICYCLE

(76) Inventor: Yu-Hsueh Chu, No. 15, Lane 93, Ho Chiang St., Taipei (TW)

( * ) Notice: Subject to any disclaimer, the term of this patent is extended or adjusted under 35 U.S.C. 154(b) by 0 days.

(21) Appl. No.: 10/170,462

(22) Filed: Jun. 14, 2002

(65) Prior Publication Data

US 2003/0033900 A1 Feb. 20, 2003

(30) Foreign Application Priority Data

Aug. 17, 2001 (TW) .................................... 90214097 U

(51) Int. Cl.⁷ .............................................. B62K 21/16
(52) U.S. Cl. ....................... 74/551.3; 74/551.1; 280/287
(58) Field of Search ........................... 74/551.1–551.8; 280/278, 287; 482/72

(56) References Cited

U.S. PATENT DOCUMENTS

| 617,500 | A | * | 1/1899 | Ehling ........................ 74/551.3 |
| 4,417,745 | A | * | 11/1983 | Shomo ........................ 280/287 |
| 4,824,131 | A | * | 4/1989 | Thay ........................... 280/278 |
| 5,749,816 | A | * | 5/1998 | Froelich et al. ............. 482/123 |
| 6,135,668 | A | * | 10/2000 | Lin ............................ 403/322.4 |
| 6,354,618 | B1 | * | 3/2002 | Liao ............................ 280/287 |

| 2002/0160888 | A1 | * | 10/2002 | Chen et al. ................... 482/77 |

FOREIGN PATENT DOCUMENTS

| JP | 10-119866 | * | 5/1998 | ................. 74/551.3 |
| JP | 2002-37171 | * | 2/2002 | ................. 74/551.3 |
| WO | WO 99/42354 | * | 8/1999 | ................. 74/551.3 |

* cited by examiner

*Primary Examiner*—Vinh T. Luong
(74) *Attorney, Agent, or Firm*—Rosenberg, Klein & Lee

(57) ABSTRACT

A compact folding handle bar apparatus for a bicycle is provided. The folding handle bar apparatus includes a first handle bar and a second handle bar each having formed thereon a handle holder. Each handle holder is formed with a hollow body configuration and has transversely projecting therefrom a pair of connecting members separated one from the other by a gap. A pin is pivotally coupled to extend between the connecting members of the first handle bar. The folding handle bar apparatus also includes a stem coupled to the first and second handle bars, as well as a control screw device coupled to the pin through the gap between the connecting members of the first handle bar. The control screw device is displaceable with the pin between fastening and releasing positions relative to the first and second handle bars. In the fastening position, the control screw device extends at least partially through the gap formed between the connecting members of both the first and second handle bars.

13 Claims, 3 Drawing Sheets

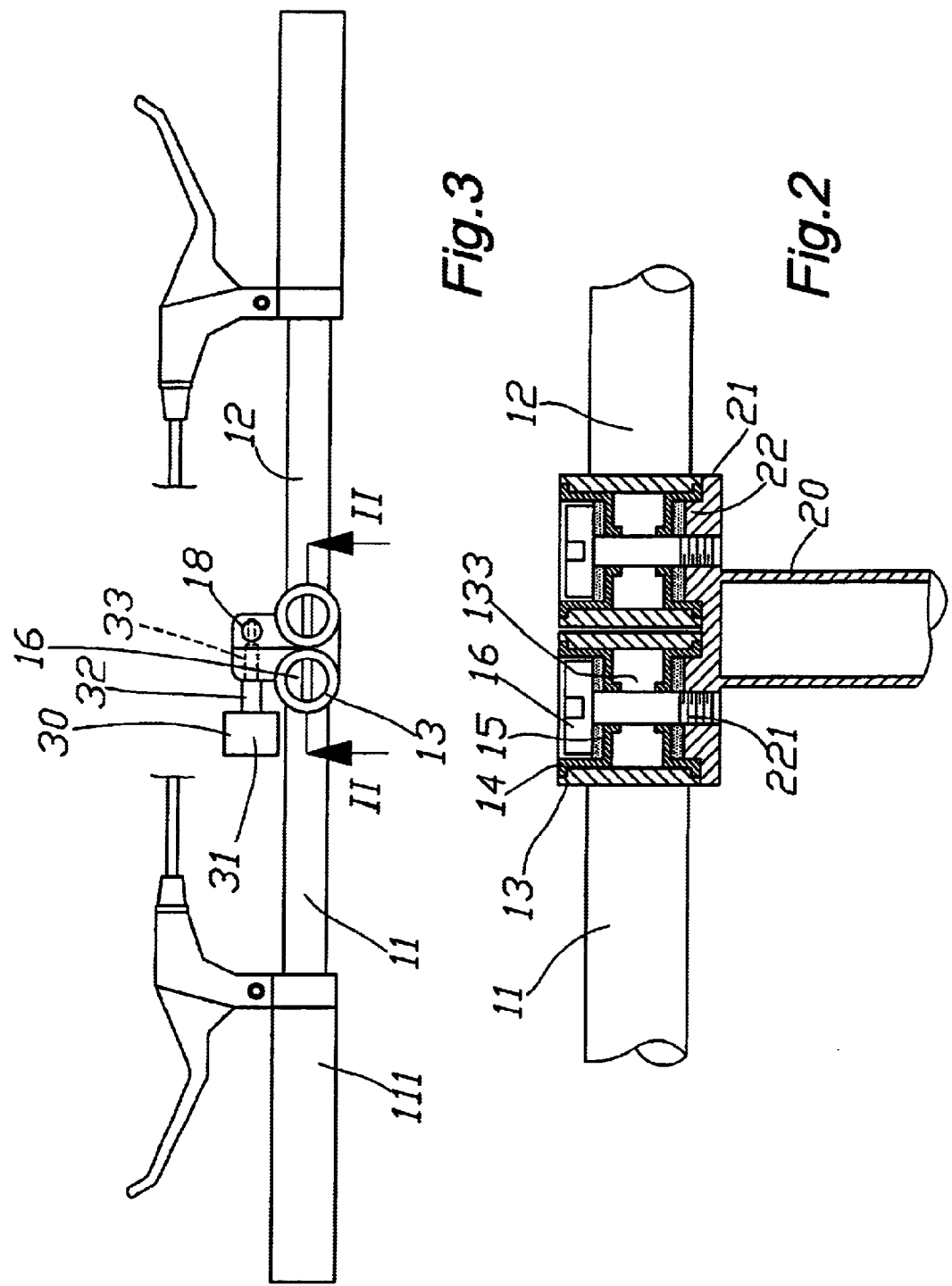

COMPACT FOLDING HANDLE BAR APPARATUS FOR BICYCLE

FIELD OF THE INVENTION

The present invention relates to a folding handle bar device, and more particularly, to a quickly and conveniently foldable handle bar device for a bicycle which folds to a compact configuration.

DESCRIPTION OF THE RELATED ART

The bicycle is an apparatus widely used not only for transportation, but for exercise and leisure activities. In order to heighten convenience for storage or portability, the structure of a bicycle is often adapted for collapsible reconfiguration. The presently developed folding structures of bicycles enhance mobility and usability, permitting the bicycles to be carried by car or other vehicles. Many portions of bicycles have been formed with folding structure to minimize the folded volume of the given bicycle. While such structures help to achieve the advantages of convenient transport, storage, and handling, so far a suitable design for a folding handle bar that maintains the required degree of safety yet provides convenience of use is heretofore unknown. Known folding handle bars typically required the use of tools to fasten or release.

BRIEF SUMMARY OF THE INVENTION

Therefore, it is an object of the present invention to provide a folding handle bar for a bicycle which advantageously holds to a compact configuration.

Another object of this invention is to provide a folding handle bar for a bicycle that is quickly and conveniently re-configurable between folded and operational configurations.

Still another object of this invention is to provide a folding handle bar structure that is advantageously different from conventional folding handle bar structures.

BRIEF DESCRIPTION OF THE DRAWINGS

The appended claims particularly point out and distinctly claim the subject matter of this invention. The various objects, advantages, and novel features of this invention will be more fully apparent from a reading of the following detailed description in conjunction with the accompanying drawings in which like reference numerals refer to like parts, and in which:

FIG. 2 is a sectional view of one embodiment of this invention taken along the corresponding line marked in FIG. 3;

FIG. 3 is a top view of a handle bar in the embodiment of this invention shown in FIG. 2;

DETAILED DESCRIPTION OF THE PREFERRED EMBODIMENTS

Figure 1:
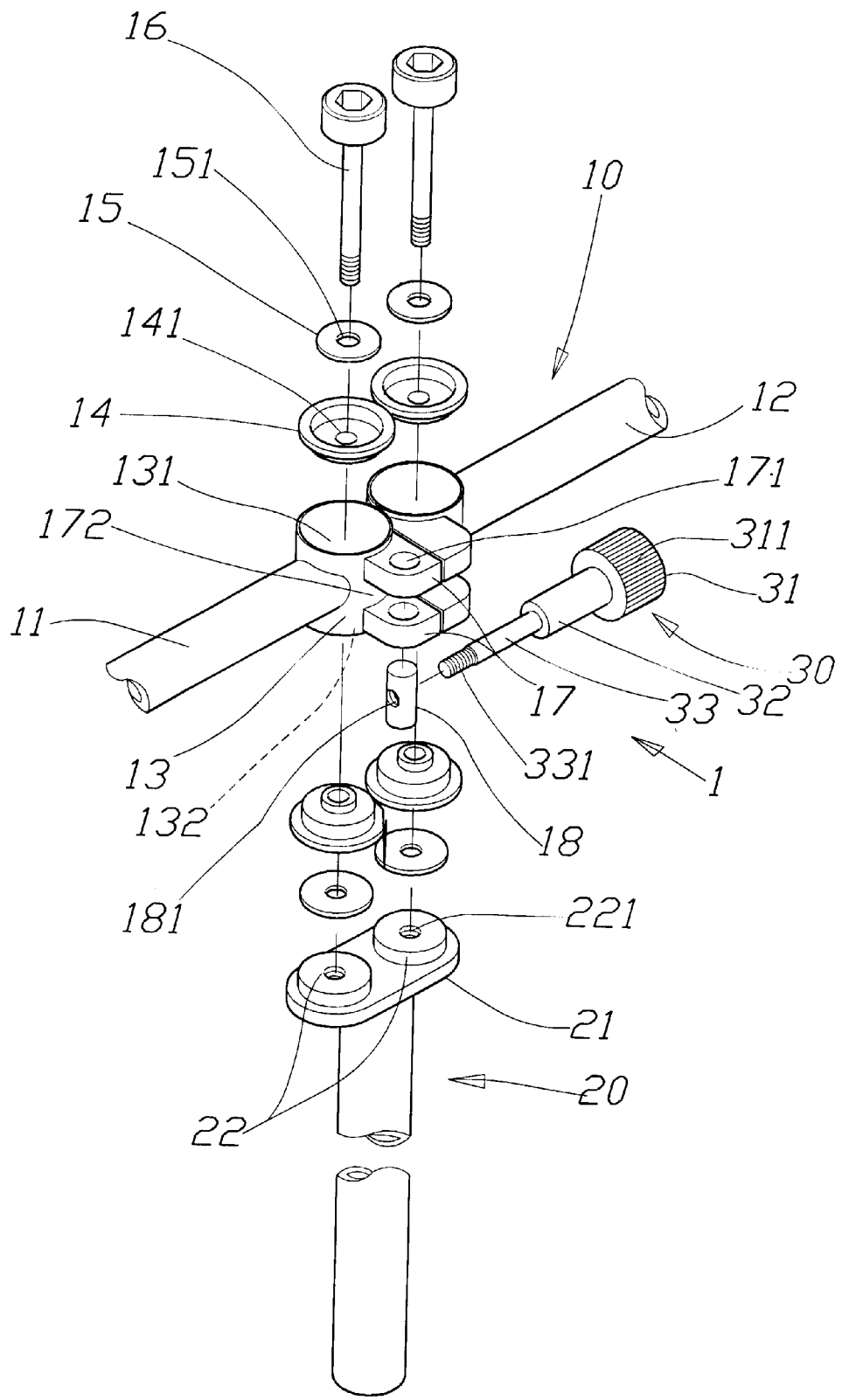
FIG. 1 is an explosive view of one embodiment of this invention.

Referring to FIG. 1, the subject folding handle bar for a bicycle comprises a folding handle bar 1 including a handle bar assembly 10, a stem 20, and a control screw device 30. The handle bar assembly 10 includes a first handle bar 11 and a second handle bar 12, which are formed with substantially the same though complementary structures. One end of the first handle bar 11 holds a handle grip 111 (refer to FIG. 3), and the other end is formed with a handle holder 13 which defines two rooms 131, 132 connected by a center path 133. The rooms 131, 132 may be replaced, for instance, by a hollow body configuration forming the handle holder 13.

A fastening housing 14 holding a pad 15 is engaged to each room 131, 132 of the handle holder 13. Each pad 15 is preferably a plastic friction lining but may be replaced, for instance, by a suitable bearing. The fastening housing 14 and the pad 15 are formed with respective locating holes 141, 151, for receiving therethrough a screw bolt 16 prior to its passage through the path 133.

At a side of one handle holder 13 is formed a pair of connecting members 17 separated by a gap 172. The connecting members 17 are formed with holes 171 pivotally holding a pin 18. A transverse hole 181 with internal screw threads is formed in the pin 18 to be disposed within the gap 172 defined by the connecting members 17.

The stem 20 is coupled to the handle bar assembly 10 at its top portion which is provided with a bracket 21 having two columns 22. The two columns are coupled to the first and second handle bars 11, 12. Each column has formed therein a screw threaded hole 221. The control screw device 30 includes a screw cap 31, a fastening screw part 32, and a screw rod part 33. The diameter of the fastening screw part 32 is greater than the gap 172 between the connecting members 17. The diameter of the screw rod part 33 is less than that of the fastening screw part 32, and less than the gap 172 between the connecting members 17. The screw cap 31 is formed with screw threads to facilitate gripping by hand to fasten or release. The terminal end of the screw rod part 33 is formed with screw threads for threaded coupling to the hole 181 of pin 18.

Referring to FIG. 2, in the folding handle bar for a bicycle as shown, the columns 22 of stem 20 insert into the lower rooms 132 of the first and second handle bars 11, 12. The respective screw bolts 16 are passed through the fastening housings 14, the pads 15, and the paths 133 to fasten by engaging the holes 221 of the columns 22. The screw rod part 33 of control screw device 30 threadedly couples with the hole 181 of pin 18 by passing into the gap 172 between the connecting members 17 of the first handle bar 11. The control screw device 30 then fastens the second handle bar 12 in position with its fastening screw part 32 passing between the connecting members 17.

Figure 4:
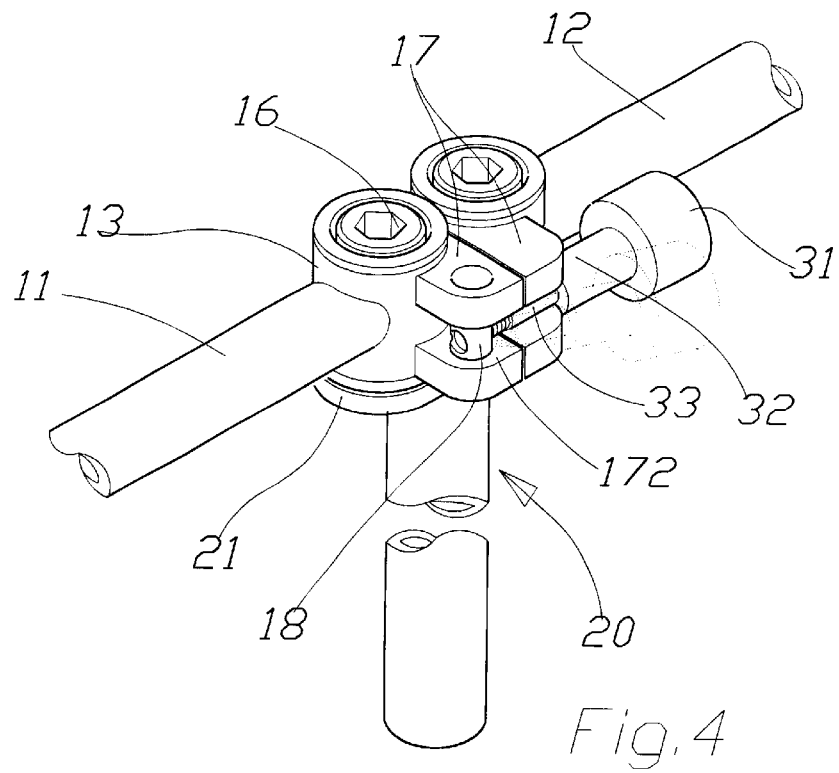
FIG. 4 is an assembly drawing of the embodiment of this invention shown in FIGS. 1–3 before the handle bar is folded; and, FIG. 5 is an assembly drawing of the embodiment of this invention shown in FIGS. 1–4 after the handle bar is folded.
Figure 5:
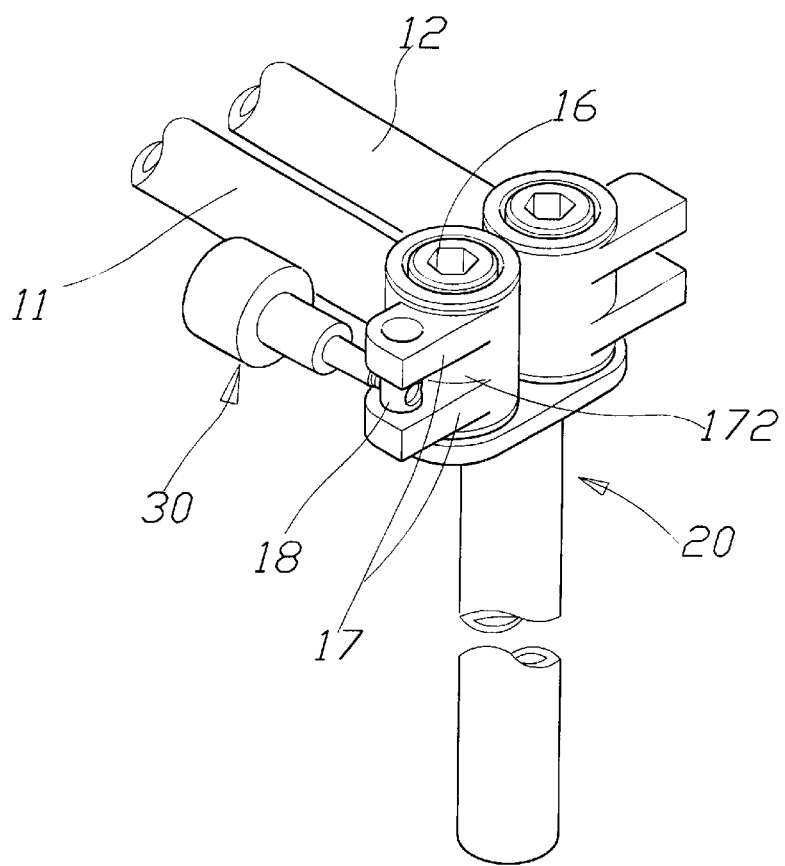

Referring to FIGS. 4 and 5, the folding handle bar may be unlocked for folding by releasing the control screw device coupled to the pin 18, by pivotally displacing to take the fastening screw part off the connecting members 17 of the second handle bar 12. The control screw device is moved towards the first handle bar 11. The first and second handle bars 11, 12 are then freed to be pivoted to a folded configuration in which they are disposed in parallel adjacent manner.

While this invention has been described with reference to illustrative embodiments thereof, this description is not intended to be construed in a limiting sense. Various modifications and combinations of the illustrative embodiments, as well as other embodiments of the invention, will be apparent to persons skilled in the art upon reference to the description. The teachings and concepts of the present invention may be applied to other types of components, systems, and structures, as the principles of the present invention are practicable in a number of applications and technologies. It is therefore intended that the appended claims encompass any such modifications or embodiments.

What is claimed is:

1. A compact folding handle bar apparatus for a bicycle comprising:

a handle bar assembly including a first handle bar and a second handle bar, each of said first and second handle bars having formed thereon a handle holder having a hollow body configuration, and each said handle holder having transversely projecting therefrom a pair of connecting members separated one from the other by a gap, a pin being pivotally coupled to said connecting members of said first handle bar to extend therebetween;

a stem coupled to the first and second handle bars; and, a control screw device coupled to said pin through the gap between said connecting members of said first handle bar, said control screw device being displaceable with said pin between fastening and releasing positions relative to said first and second handle bars, said control screw device in said fastening position extending at least partially through the gaps between said connecting members of both said first and second handle bars.

2. The compact folding handle bar apparatus as recited in claim 1 wherein said stem includes a bracket having a pair of columns extending therefrom to engage said handle holders of said first and second handle bars, each said column having formed therein an internally screw threaded hole for receiving a screw bolt passed through one said handle holder.

3. The compact folding handle bar apparatus as recited in claim 1 wherein each said handle holder defines a pair of rooms at axially opposed ends thereof.

4. The compact folding handle bar apparatus as recited in claim 3 wherein each said room of each said handle holder further receives a fastening housing having a first center hole formed therethrough.

5. The compact folding handle bar apparatus as recited in claim 4 wherein each said fastening housing receives a pad having a second center hole formed therethrough.

6. The compact folding handle bar apparatus as recited in claim 1 wherein the gaps defined between said connecting members of said first and second handle bars are aligned one with the other.

7. The compact folding handle bar apparatus as recited in claim 1 wherein said connecting members of said first handle bar are each formed with a locating hole pivotally engaged by said pin.

8. The compact folding handle bar apparatus as recited in claim 1 wherein said pin has formed at an intermediate portion thereof a transverse hole engaged by said control screw device.

9. The compact folding handle bar apparatus as recited in claim 1 or 7 wherein said control screw device includes a screw cap, a fastening screw part extending axially from said screw cap, and a screw rod part extending axially from said fastening screw part.

10. The compact folding handle bar apparatus as recited in claim 9 wherein the diameter of said fastening screw part is greater than the gap between said connecting members of said first and second handle bars.

11. The compact folding handle bar apparatus as recited in claim 9 wherein the diameter of said screw rod part is less than the diameter than said fastening screw part, and less than the gap between said connecting members of said first and second handle bars.

12. The compact folding handle bar apparatus as recited in claim 9 wherein said screw cap has formed thereon a plurality of external screw threads for gripping during fasten and release manipulation thereof.

13. The compact folding handle bar apparatus as recited in claim 1 wherein said rooms defined by each said handle holder are disposed in open communication one with the other by a path extending centrally therebetween.

* * * * *